United States Patent [19]
Ikeda

[11] Patent Number: 5,608,700
[45] Date of Patent: Mar. 4, 1997

[54] REMOTE CONTROLLER HAVING INTEGRATED CIRCUIT MEMORY FOR RECORDING AND REPLAYING SIGNALS FROM AUDIO PLAYBACK DEVICES AND/OR EXTERNAL VOICE SIGNALS

[76] Inventor: Takeshi Ikeda, 2-5-6-213, Sanno, Ohta-ku, Tokyo, Japan

[21] Appl. No.: 369,397

[22] Filed: Jan. 6, 1995

[51] Int. Cl.[6] .................................................. G11B 19/00
[52] U.S. Cl. ........................ 369/24; 369/25; 340/825.15; 434/157; 434/169; 434/319; 434/320
[58] Field of Search ................................ 369/24, 25, 29, 369/6, 7; 340/825.15; 434/156, 157, 169, 319, 320

[56] References Cited

U.S. PATENT DOCUMENTS

5,247,293  9/1993  Nakagawa ........................ 340/825.25

Primary Examiner—David C. Nelms
Assistant Examiner—Andrew Q. Tran
Attorney, Agent, or Firm—Oliff & Berridge

[57] ABSTRACT

A remote controller is disclosed having recording and playback functions which enables repetitive operation in applications such as language study. The remote controller is used in combination with conventional audio recording and playback devices and imposes only a small economic burden on the user. The remote controller includes the following capabilities: recording external audio signals, playback of the signals, storing recordings in memory for future playback, and controlling the operation of an audio recording and playback device.

19 Claims, 6 Drawing Sheets

REMOTE CONTROLLER HAVING INTEGRATED CIRCUIT MEMORY FOR RECORDING AND REPLAYING SIGNALS FROM AUDIO PLAYBACK DEVICES AND/OR EXTERNAL VOICE SIGNALS

BACKGROUND OF THE INVENTION

The present invention relates to a remote controller with recording and playback functions for connection to playback equipment, such as a cassette tape player, to enable repetitive practice in applications such as language study.

Recording and playback equipment, such as tape recorders, have been used for many years as devices for aiding the study of language and other subjects. Recording and playback devices, specially designed for language study, are commonly available. These specialized language study devices include functions such as repeat, whereby the user can repeatedly listen to important passages, and overlap recording, whereby the users voice is overlapped on the playback sound.

In addition to specialized equipment, the use of ordinary audio cassette tape recorders for language and other studies is also commonplace. In order to repeatedly play an important passage using an ordinary audio cassette tape recorder, the recorded tape must be rewound and set to play for each repeated play. Also, since the user's voice cannot be overlap recorded on the playback sound, study usually proceeds by listening only to the prerecorded sound.

Specialized language study recording and playback devices include functions such as repeat, which are absent from ordinary audio cassette tape players, in order to improve effectiveness as a study aid. Consequently, when using such equipment for study, specialized software must be purchased in addition to the specialized recording and playback device hardware, thus posing a considerable economic burden on the user.

When using a conventional audio cassette player or similar device for language or other study, complex operation is needed to repeatedly listen to an important passage. In addition, the user's voice cannot be overlap recorded on the playback sound. For these reasons, conventional audio cassette players or similar devices do not provide an effective tool for study purposes. Furthermore, general purpose audio cassette tape players were developed with the objective of playing music, not designed to repeatedly rewind and play back in a very short time. Consequently, there is a risk of damaging switches from excess operation; such operation is not desirable from the viewpoint of durability.

In view of the above, the need arises for a simple device capable of providing the effectiveness of specialized equipment when used in combination with a conventional general purpose device, such as an audio cassette tape player.

SUMMARY OF THE INVENTION

The present invention considers the above mentioned problems of conventional audio cassette players and seeks to remedy the problems by disclosing a remote controller having recording and playback functions for use with conventional audio recording and playback equipment. The remote controller provides a user with an effective study tool which allows repetitive study of language and other subjects, while reducing the economic burden on the user.

In order to achieve these objectives, a remote controller according to the present invention is connected to an audio playback device, such as a cassette tape player, which produces a playback audio signal from audio data recorded on a recording medium (i.e., tape) and comprises:

operation means for producing recording and playback command outputs which correspond to respective operations directing recording and playback;

memory means for storing an audio signal;

recording means for writing the audio signal into the memory means in response to the recording commands; and playback means for producing a playback output from the audio signal stored in the memory means in response to the playback commands, whereby an audio signal output from the audio playback device can be recorded and played back.

Operating means of the remote controller according to the present invention starts the playback operation of the audio playback device. The audio signal output of the audio playback device is received by the input of the remote controller. By directing the operating means to produce the recording command, the audio signal is written into the memory means by the recording means. Afterwards, by directing the operating means to produce the playback command, the audio signal stored in the memory means is read out by the playback means to produce the output.

As a consequence of the present invention, the audio playback device need only have a simple playback function. Consequently, conventional, commonly available audio cassette tape players or similar devices can be used. In addition, part of the playback sound can be stored in the internal memory of the remote controller and played back freely, thereby allowing easy repetitive playback of important passages.

Preferably, the remote controller according to the present invention further comprises a switching means for selecting either the audio signal output from the playback means of the remote controller or the audio signal output from the audio playback device. Typically, the audio signal output from the audio playback device is automatically selected, unless the remote controller playback output is selected.

A preferred embodiment of the remote controller according to the present invention includes the ability to stop playback operation of the audio playback device with the playback command output from the remote controller operating means, thereby allowing easy control of the audio playback device by the remote controller operating means.

Another preferred embodiment of the remote controller according to the present invention further comprises:

a microphone for converting an externally produced sound into an audio signal having a predetermined level; and recording means for recording the audio signal input from the microphone into the memory means when directed to by the recording command. This embodiment allows, in addition to recording and playback of the audio signal output from the audio playback device, the capability of recording and playing back an original user sound directed toward the microphone while listening to the sound output from the audio playback device.

As a result of using the above type of construction, the audio playback device need only have a simple playback function. Thus, a conventional, commonly available playback device such as an audio cassette tape, player can be used in combination with the remote controller. In addition, since an original sound, supplied by a user while listening to the playback sound, can be stored in the internal memory means of the remote controller and freely played back, the playback sound and user supplied sound can be easily compared.

In the above case, the recording means of the remote controller can further comprise mixing means wherein the audio signal from the microphone and the audio signal output from the audio playback device are mixed in response to a recording command. The audio signal output from the mixing means is written into the memory means. The recording means can further comprise analog to digital (A/D) converter means for converting the output signal produced during playback operation of the audio playback device into a digital signal and recording control means for controlling memory means write-in of the digital audio signal output from the A/D converter means in response to a recording command input.

The playback means can further comprise playback control means for controlling read-out of the digital audio signal stored in the memory means in response to a playback command input and digital to analog (D/A) converter means for converting the digital audio signal readout from the memory means into an analog audio signal.

Preferably, a remote controller according to the present invention further comprises remote control means for producing remote control signal outputs, including playback operation and stop control signals, to the audio playback device in response to the remote control playback operation and stop commands. In particular, operating means of the remote controller produces playback operation command and stop command outputs for remote control of the audio playback device in response to remote controller operations. Preferably, in addition to the playback operation command output, the operating means also produces the recording command output for remote control of the audio playback device in response to remote controller operations.

Preferably, the remote controller of the present invention further comprises audio output means for converting the audio signal output from the switching means into an audio signal. Preferably, the audio output means can be in the form of an earphone.

A preferred construction of the remote control means simultaneously produces a stop signal output to stop play of the audio playback device when the playback command output is produced from the operating means. This allows easy operation of the operating means.

According to another preferred embodiment, a remote controller of the present invention is connected to an audio playback device which produces a playback audio signal from audio data stored by a recording medium, such as a cassette tape. The remote controller comprises a microphone for converting an externally supplied sound into an audio signal having a predetermined level; operating means for producing recording and playback command outputs corresponding to respective operations directing recording and playback; memory means for storing the audio signal; recording means for writing the input audio signal from the microphone into the memory means in response to the recording command; and playback means for producing an output from the audio signal stored in the memory means in response to the playback command. While listening to the sound output from the audio playback device, a sound supplied to the microphone can be recorded and played back, given the above system construction.

DETAILED DESCRIPTION OF PREFERRED EMBODIMENTS

FIRST EMBODIMENT

Figure 1:
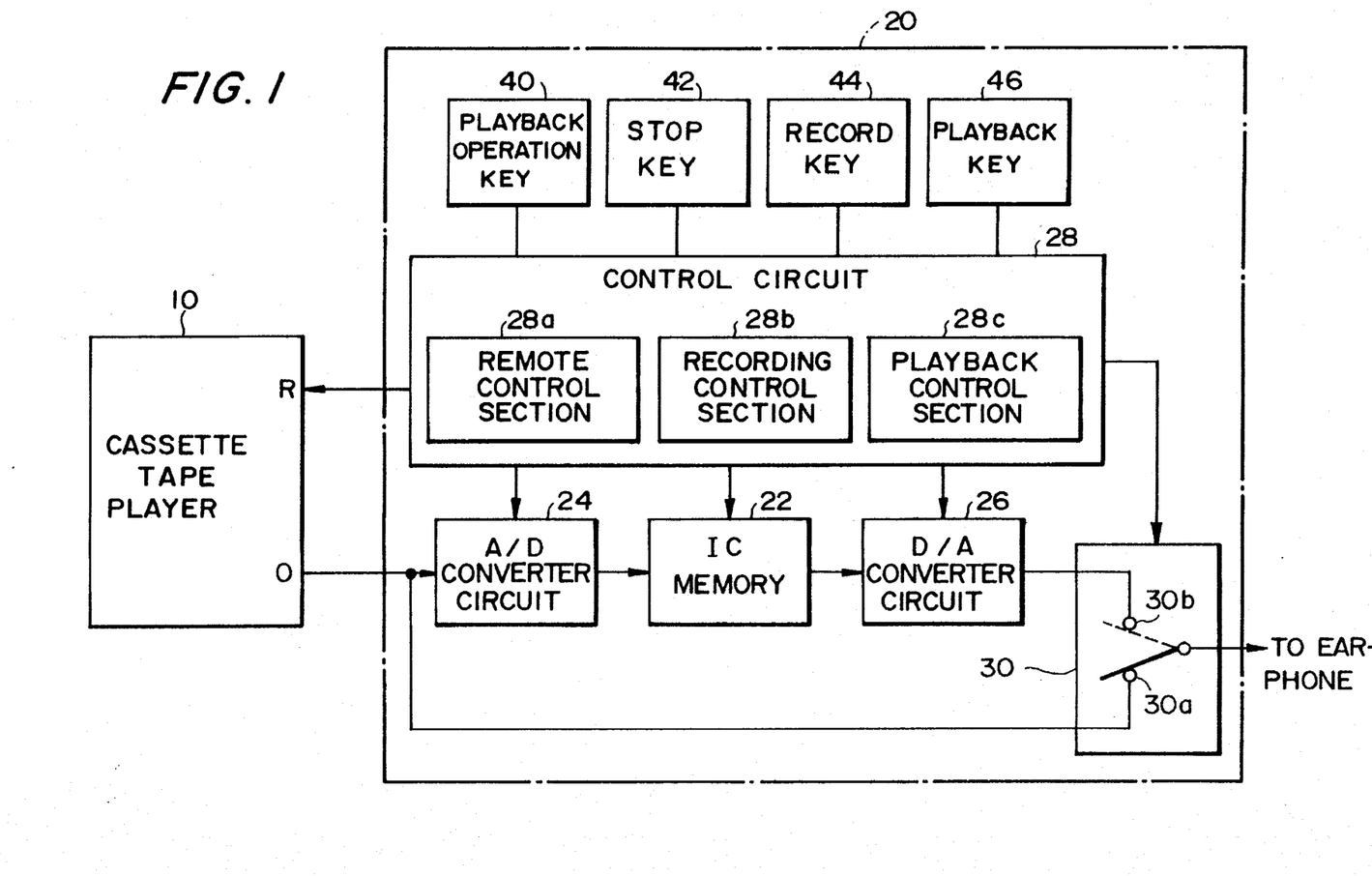
FIG. 1 is a block diagram showing overall construction of a system according to a first embodiment of the present invention.

FIG. 1 illustrates overall construction of a remote controller according to a first embodiment of the present invention. The figure indicates construction of a study system for languages and other subjects by connecting a remote controller 20 to a cassette tape player 10. A conventional audio device can be used, in place of the cassette tape player 10, with the remote controller 20 connected to an output terminal 0 and a remote control terminal R.

The remote controller 20 includes functions for supplying start and stop commands to the cassette tape player 10, and for recording and playing back the audio signal output from the output terminal 0. The remote controller 20 comprises an integrated circuit (IC) memory 22, an A/D converter circuit 24, a D/A converter circuit 26, a control circuit 28, a selector switch 30, a playback operation key 40, a stop key 42, a record key 44 and a playback key 46.

The playback operation key 40, stop key 42, record key 44, and playback key 46 function as the operating means of the remote controller. The playback operation key 40 and stop key 42, respectively, instruct the cassette tape player 10 to start and stop, while the record key 44 and playback key 46, respectively, instruct the remote controller to record the audio signal output from the cassette tape player 10 output terminal 0 and to play back the recording.

The IC memory 22 stores the digitally converted audio signal and preferably comprises a dynamic or static RAM (random access memory) having a capacity of several megabits. By changing the IC memory 22 storage capacity, the sound storage capacity can range from several seconds to several minutes.

The A/D converter circuit 24 samples the output audio signal from the cassette tape player 10 output terminal 0 at a predetermined frequency and encodes each sampled audio signal into a digital signal having a predetermined bit length. Although a linear encoder can be used as the digital encoding means, linear encoders alone have limited memory capacity. In order to store a audio signal of long duration with a limited memory capacity, a linear encoder should be used in combination with suitable compression technology. For example, conventional audio data compression technology, such as a logarithmic compression/expansion PCM (pulse coded modulation) system or ADPCM (audio data pulse coded modulation) system, can be utilized. The output audio digital signal from the A/D converter circuit 24 is supplied to the IC memory 22 input for storing.

The D/A converter circuit 26 converts the digital audio signal readout from the IC memory 22 into an analog audio signal according to a predetermined conversion principle as performed by the A/D converter. If the above mentioned A/D converter performs simple linear encoding, the D/A converter circuit 26 need only perform simple linear decoding. However, if audio data compression is used, the compressed signal is expanded by the D/A converter, then decoded to produce the analog audio signal output. The audio signal output from the D/A converter circuit 26 is sent to the selector switch 30, described below.

The selector switch 30 comprises terminals 30a and 30b. The audio signal output from the cassette tape player 10 output terminal O is supplied to terminal 30a, and the audio signal output from the D/A converter circuit 26 (i.e., the audio signal temporarily stored in the IC memory 22) is supplied to terminal 30b. Either one of these audio signals is selected as the selector switch 30 output. The selected audio output signal is converted into sound by an earphone (not shown in the figure) for reference by the user.

The control circuit 28 supplies playback and stop remote control signal outputs to the cassette tape player 10 remote control terminal R in response to operation signals from the keys 40, 42, 44 and 46. In addition, control circuit 28 controls the A/D converter circuit 24, IC memory 22 and, D/A converter circuit 26 for recording and playback functions.

The control circuit 28 comprises a CPU (central processing unit), a ROM (read only memory) containing a predetermined control program, and a RAM for performing data read and write functions. The control circuit 28 further comprises control sections 28a, 28b and 28c. Remote control section 28a sends the remote control signal output to the cassette tape player 10 remote control terminal R in response to the playback operation key 40 and stop key 42. Recording control section 28b controls the A/D converter circuit 24 and IC memory 22 in response to the record key 44. Playback control section 28c controls the IC memory 22, D/A converter circuit 26 and switching circuit 30 in response to the playback key 46.

By operating (e.g., pressing) the playback operation key 40, a playback command is sent as the remote control signal from the remote control section 28a to the cassette tape player 10 terminal R for starting the cassette tape player 10 playback operation. Similarly, by operating (e.g., pressing) the stop key 42, the stop command is sent as the remote control signal from the remote control section 28a for stopping the cassette tape player 10 playback operation.

A single switching key can also be used for both the playback operation key 40 and stop key 42 functions. In this case, setting the switching key to "on" starts the cassette tape player 10 playback operation and setting the switching key to "off" stops the cassette tape player 10 playback operation.

When the recording key 44 is pressed, the recording control section 28a signals the A/D converter circuit 24 and IC memory 22 to begin audio signal writing. In particular, the A/D converter circuit 24 begins sampling and encoding operations while the IC memory 22 write-in control begins. According to the present embodiment, the recording control section 28b further comprises a counter, functioning as an address means for the IC memory 22. The value counted by the counter is sent as the write address for storing the audio signal in the IC memory 22 continuous area.

When the playback key 46 is pressed, the playback control section 28c signals the IC memory 22, D/A converter circuit 26 and selector switch 30 to begin reading out and playback of the audio signal. In this case, the playback control section 28c uses the write address value of the recording control section 28b counter as the readout address during playback. The audio signal stored in the IC memory 22 continuous area is readout in the write-in sequence and supplied to the D/A converter circuit 26. The D/A converter circuit 26 decodes the audio signal by the opposite procedure as the A/D converter circuit 24 and supplies the decoded audio signal to the selector switch 30.

During playback control, the playback control section 28c controls the setting of the selector switch 30, either to the terminal 30b side or to the terminal 30a side. By setting the selector switch to the terminal 30b, the audio signal output from the D/A converter circuit 26 is sent via terminal 30b to the earphone.

The following is a description of the operation of a remote controller of the present invention having the type of construction described above.

1) Normal playback operation

To perform normal playback with the cassette tape player 10, a user simply presses the playback operation key 40. In this mode, a control signal is sent from the remote control section 28a to the cassette tape player 10 remote control terminal R to start the playback operation. The playback audio signal from the cassette tape player 10 output terminal O is supplied to the selector switch 30 within the remote controller 20.

The selector switch 30 operates in response to a playback key 46 setting. When the playback key 46 is not pressed, the selector switch 30 is automatically set to terminal 30a and the input audio signal from the cassette tape player 10 is sent directly to an earphone or other external device.

To terminate normal playback operation, a user simply presses the stop key 42.

2) Memory recording operation

When the record key 44 is pressed during the cassette tape player 10 playback operation, the playback audio signal output from the cassette tape player 10 output terminal O is supplied to the A/D converter circuit 24; the signal is sampled and encoded to produce a digital signal output having a predetermined bit length for each sampling period. The recording control section 28b produces a write address output in synchronization with the A/D converter circuit operation. As a result, the digital signal output from the A/D converter circuit 24 is written into the IC memory 22 at this address. Since the write address changes sequentially, the digital audio signal output from the A/D converter circuit 24 can be stored sequentially in the continuous address area.

3) Playback from memory operation

A user simply presses the playback key 46 to read and playback the audio signal stored in the IC memory 22. When the playback key 46 is pressed, the selector switch 30 is set from terminal 30a to terminal 30b. The playback control section 28c sends the readout address, for example, in sequence from the header address, to the IC memory 22. Then, the audio signal stored in the IC memory 22 is readout in sequence from the header address. The audio signal readout from the IC memory 22 is applied to the D/A converter circuit 26 for decoding. The decoded analog audio signal then goes to the selector switch 30.

When the playback key 46 is pressed, the selector switch 30 selects the playback audio output from the D/A converter circuit 46 for supply to the earphone.

Figure 2:
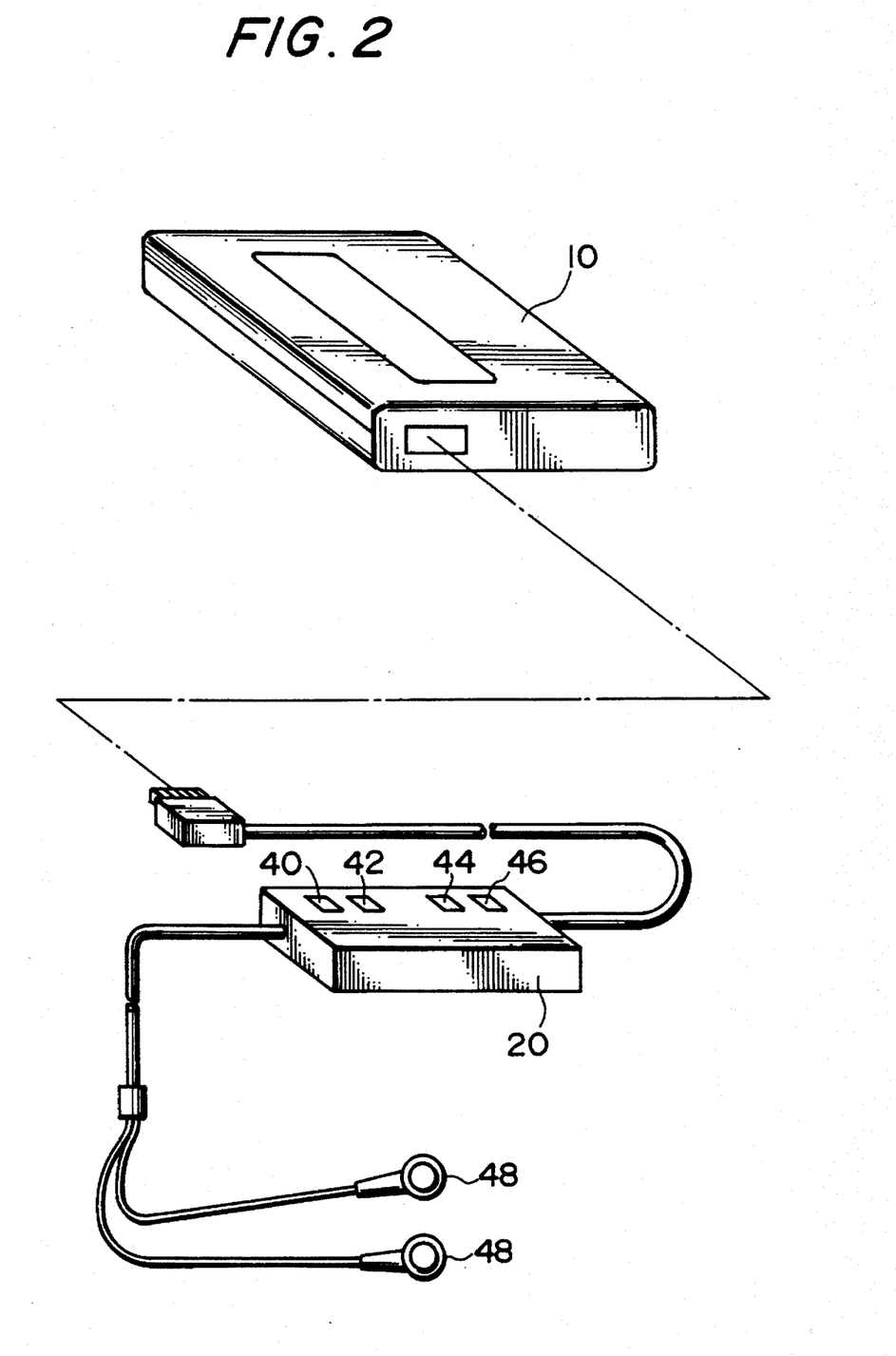
FIG. 2 shows an example of connecting the remote controller of the present invention to an audio playback device.

FIG. 2 shows an example of connecting the remote controller 20 indicated in FIG. 1 to a typical cassette tape player. As shown in the figure, many recent models of portable cassette tape players 10 include a provision for connecting a simple remote controller for such commands as playback on/off control. Thus, the remote controller 20 of the present embodiment can be directly connected to this type of cassette tape player 10.

In particular, this type of cassette tape player 10 is provided with an audio signal output terminal and an input terminal for remote controlling playback on/off. The remote controller 20 can be connected to these terminals. In addition, a pair of earphones 48 can be connected to the remote controller 20, thereby allowing enjoyment of stereo music or other audio playback when the recording and playback functions of this present invention are not being used.

Figure 3A:
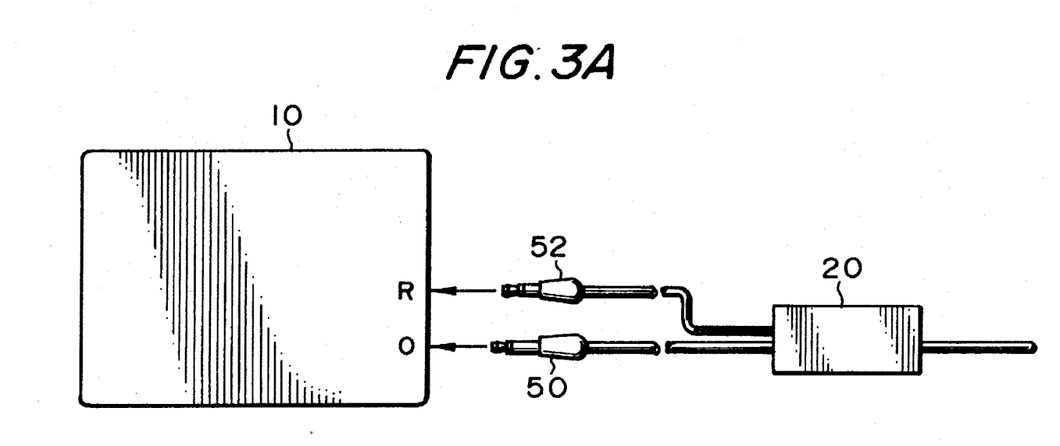
FIGS. 3A and 3B indicate other examples of connecting a remote controller according to a first embodiment of the present invention to an audio playback device.
Figure 3B:
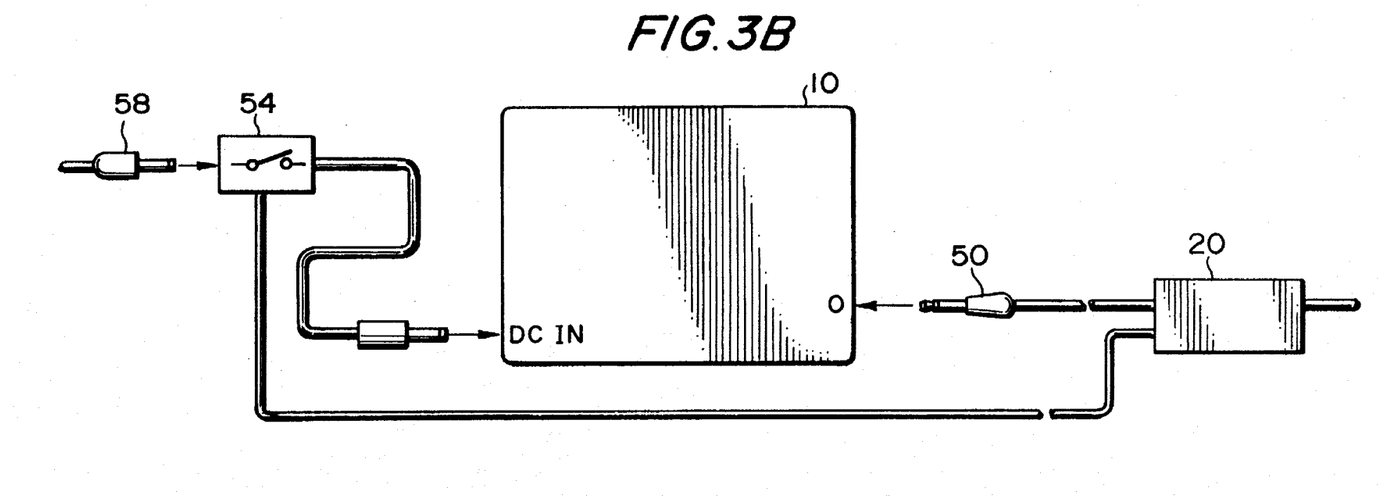

FIG. 3A and FIG. 3B show examples of connecting the remote controller 20 to conventional cassette tape players 10. In FIG. 3A, the cassette tape player 10 is provided with a remote control terminal R. Among conventional cassette tape players, many models have a selector switch provided with a microphone whereby the drive system can be operated on/off. Such models always have a remote control terminal R. Consequently, the remote control terminal R is connected to the remote controller 20 with, for example, a 25 mm diameter plug 52, and the output terminal 0 is connected to the remote controller 20 with, for example, a 35 mm diameter plug 50.

FIG. 3B shows the remote controller 20 connected to a cassette tape player 10 not equipped with a remote control terminal R. In this case, a selector switch mechanism 54 is inserted between the cassette tape player 10 power supply terminal (DC IN) and a power supply adapter plug 58. When the playback operation key 40 of the remote controller 20 is pressed, the selector switch mechanism 54 is set to "on" and the cassette tape player 10 begins playback operation. When the stop key 42 of the remote controller 20 is pressed, the selector switch mechanism 54 is held at "off" and the cassette tape player 10 playback operation stops. By using the remote controller 20 of the present embodiment in this manner, a conventional commonly available cassette tape player 10, such as used for audio or conference recording, can be easily used for recording the sound and provide repetitive playback of the recorded sound.

In the above description, the playback operation key 40 and record key 44 were mentioned as separate keys, but they can also be formed as a single key. In this case, when the playback operation key 40 is pressed, the record key 44 is automatically activated and the audio signal output from the cassette tape player 10 terminal 0 is stored sequentially in the IC memory 22.

By using this type of construction, a user can listen to a passage during cassette tape playback, without rewinding the tape, by simply pressing the playback key 46 to immediately replay the previously recorded passage. As a result, the audio or conference type cassette tape player can be used as a system having the desired functions for language study and other purposes.

In cases where the recording time exceeds the IC memory 22 capacity, a preferred construction is to have the IC memory 22 data write and read functions performed in continuous cycles. In other words, writing to the IC memory 22 during cassette tape player 10 playback always returns to the header address when the writing reaches the final address. By using this type of system, the most recent data is continuously written into the IC memory 22. Language studies can be effectively conducted using a device such as a cassette tape player, even when the remote controller has limited memory.

SECOND EMBODIMENT

Figure 4:
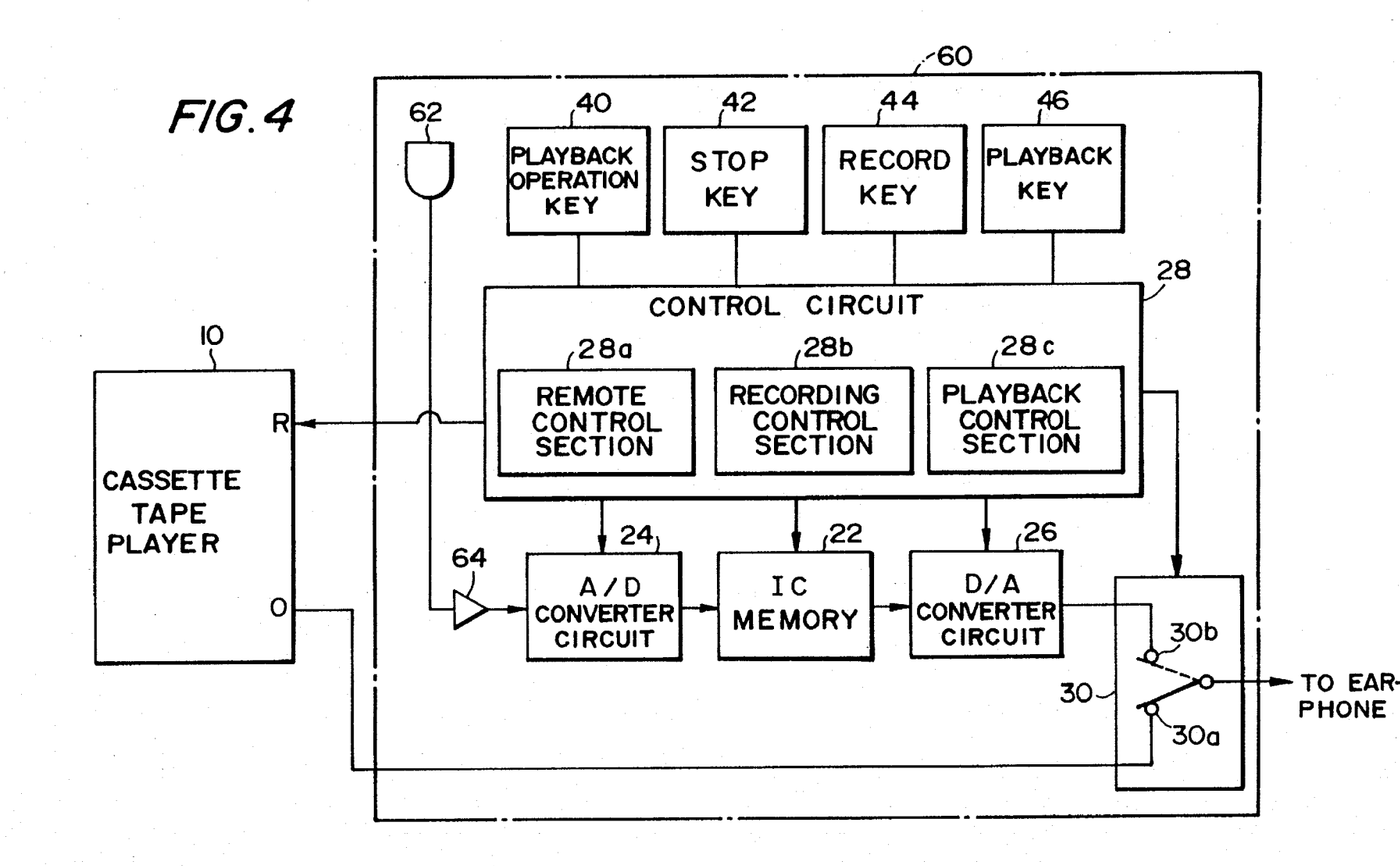
FIG. 4 is a block diagram showing overall construction of a system according to a second embodiment of the present invention.

FIG. 4 is a block diagram showing overall construction of a remote controller according to a second embodiment of the present invention. The same designations and detailed descriptions are used for items in this embodiment as used for the same items in the first embodiment.

In FIG. 4 a remote controller 60 is connected to a cassette tape player 10 audio playback device. The audio signal output from an output terminal 0 can be supplied to an earphone (not shown in the figure). The remote controller 60 has the capability of recording a user supplied sound by means of a built-in microphone and playing it back.

The remote controller 60 comprises an IC memory 22, A/D converter circuit 24, D/A converter circuit 26, control circuit 28, selector switch 30, playback operation key 40, stop key 42, record key 44, and playback key 46 having the same functions as described in the first embodiment. Remote controller 60 further comprises a built-in microphone 62 and an amplifier 64 for amplifying the microphone 62 output signal. In place of the built-in microphone, an external microphone can optionally be connected to the remote controller 60.

By pressing the record key 44 during the cassette tape player 10 playback operation or when playback operation is stopped, recording of a user supplied sound begins. The sound, converted to an electronic signal by the microphone 62, is supplied to the amplifier 64 in the form of an analog signal with a predetermined level. The signal is amplified to a fixed level and sent to the A/D converter circuit 24 for sampling and encoding. The encoded digital signal is then stored in the IC memory 22. When the playback key 46 is pressed, the digital signal stored in the IC memory 22 is read out and decoded by the D/A converter circuit 26 to produce an analog audio signal output. The detailed digital signal read and write operations with respect to the IC memory 22 are essentially the same as the above described first embodiment.

The selector switch 30 selects either the analog signal output from the D/A converter circuit 26 or the audio signal output from the cassette tape player 10 output terminal 0 for supply to the earphone.

As a result of the present embodiment, while listening to the playback audio from the cassette tape player 10 or when the playback sound is stopped, a sound supplied by a user is stored in the IC memory 22 of the remote controller 60 and is freely replayed as many times as desired, thereby allowing easy comparison of the cassette tape player 10 playback sound and the user supplied sound. Furthermore, as in the case of the first embodiment, since a conventional audio or other type of device can be used as the cassette tape player 10, a large economic burden is not placed on the user.

THIRD EMBODIMENT

Figure 5:
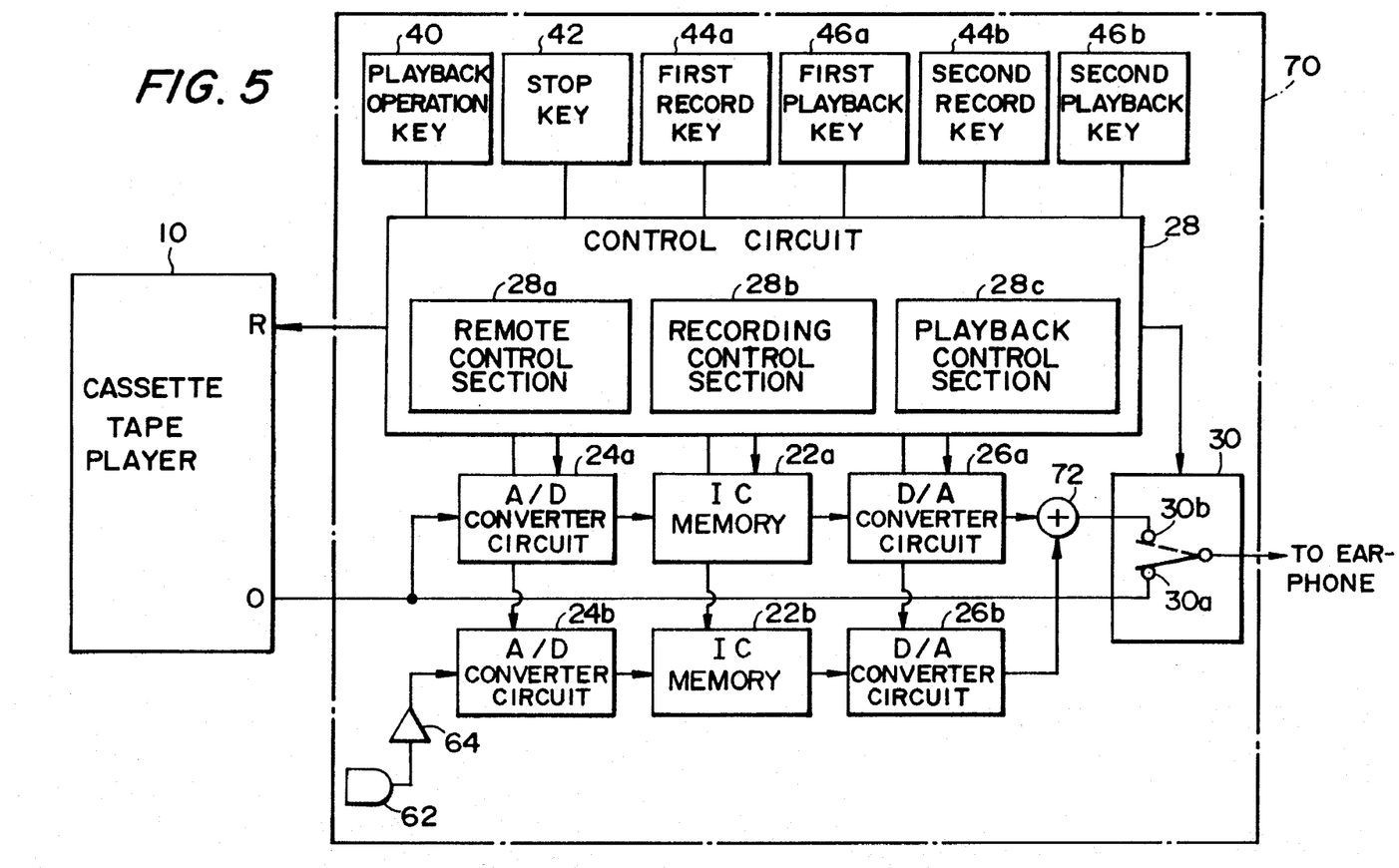
FIG. 5 is a block diagram showing overall construction of a system according to a third embodiment of the present invention.

FIG. 5 is a block diagram showing overall construction of a remote controller according to a third embodiment of the present invention. The same designations and detailed descriptions are used for items in this embodiment as used for the same items in the first and second embodiments.

In FIG. 5, a remote controller 70 combines the above-mentioned functions of remote controllers 20 and 60 of the first and second embodiments. These functions include recording and playback of a playback audio signal from a cassette tape player 10 output terminal 0 and recording and playback of a user supplied sound converted to an electronic signal by a self-contained microphone.

The remote controller 70 comprises a control circuit 28, an IC memory 22a for recording the cassette tape player 10 playback sound, an A/D converter circuit 24a, a D/A converter circuit 26a, a first record key 44a, a first playback key 46a, an IC memory 22b for recording a user supplied sound, an A/D converter circuit 24b, a D/A converter circuit 26b, a second record key 44b, a second playback key 46b, a microphone 62, an amplifier 64, a mixer 72 for mixing audio signals stored in the IC memories 22a and 22b, a selector switch 30 for selecting between the mixed signal and the cassette tape player 10 audio signal from the output terminal 0 for supply to an earphone, and a playback operation key 40 and stop key 42 for respectively sending playback operation start and stop commands to the cassette tape player 10.

When the first record key 44a is pressed, the recording control section 28b of the control circuit 28 signals the A/D converter circuit 24a and the IC memory 22a to begin writing the audio signal output from the cassette tape player 10 into the IC memory 22a, as in the first embodiment. When the second record key 44b is pressed, the recording control section 28b signals the A/D converter circuit 24b and the IC memory 22b to begin writing the audio signal from the microphone 62 into the IC memory 22b, as in the second embodiment.

When the first playback key 46a is pressed, the playback control section 28c signals the IC memory 22a and D/A converter circuit 26a to begin sending the audio signal written into the IC memory 22a to the mixer 72. When the second playback key 46b is pressed, the playback control section 28c signals the IC memory 22b and D/A converter circuit 26b to begin sending the audio signal written into the IC memory 22b to the mixer 72.

Moreover, when only one of the first and second playback keys 46a and 46b is pressed, the playback control section 28c signals the selector switch 30 to the terminal 30b position, and at other times, signals the selector switch 30 to the terminal 30a position.

As a result, the cassette tape player 10 audio output recording and playback operations with respect to the IC memory 22a are essentially the same as in the first embodiment, while the user supplied sound recording and playback operations with respect to the IC memory 22b are essentially the same as in the second embodiment. The mixer 72 then mixes the audio output signal from the D/A converter circuit 26a and the audio output signal from the D/A converter circuit 26b for supply to one input terminal of the selector switch 30. When either playback key 46a or 46b is pressed, the selector switch 30 selects the mixer 72 output for supply no the earphone. When neither playback key 46a or 46b is pressed, the playback audio signal output from the cassette tape player 10 is sent directly to the earphone.

As a result of the present embodiment, recording and playback operations for both the cassette tape player 10 playback audio signal and the user supplied sound are performed separately. The user supplied sound can be overlap recorded on the cassette tape player 10 playback audio signal, thereby allowing simultaneous playback and easy comparison of these sounds. Furthermore, since the recording and playback system for both the cassette tape player 10 playback audio and the user supplied audio are separately provided, the sounds can be recorded and played back at a desired timing. Recording unnecessary sounds can also be prevented.

Although the above description provided first and second record keys 44a and 44b independently, these keys can optionally comprise a single key. In this case, audio signal writing to IC memories 22a and 22b is performed simultaneously. Furthermore, a preferred construction is to replace first and second playback keys 46a and 46b with a single key, so that audio signal readout from IC memories 22a and 22b is performed simultaneously by pressing a single key.

Optionally, the playback operation key 40, first record key 44a and second record key 44b comprise a single key so as to enable simultaneous audio signal writing to IC memories 22a and 22b when performing the cassette tape player 10 playback operation.

The above description also referred to separate circuit systems for recording the cassette tape player 10 playback sound and the user supplied sound; however, recording can also be performed using the same circuit system.

Figure 6:
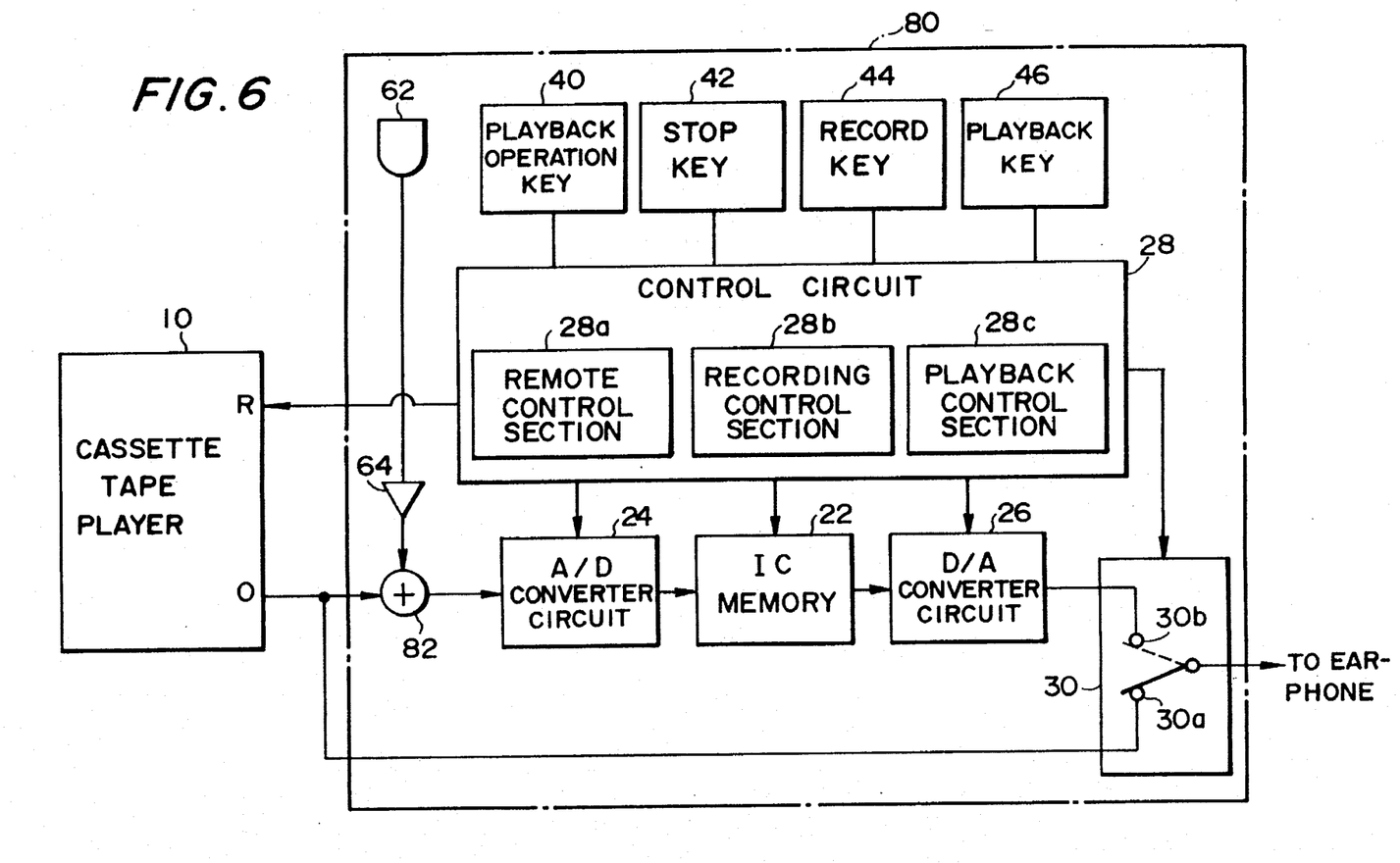
FIG. 6 is a block diagram showing overall construction of a system according to a variation of the third embodiment of the present invention.

FIG. 6 is a block diagram showing an example of construction when the same circuit system is used for recording the cassette tape player 10 output sound and the user supplied sound. With respect to the remote controller 20 indicated in FIG. 1, a remote controller 80 shown in FIG. 6 additionally comprises a microphone 62, an amplifier 64 and a mixer 82. As a result, the audio signal of the microphone and the cassette tape player 10 playback audio signal output are combined by the mixer 82 for supply to the A/D converter circuit 24. Consequently, when the record key 44 is pressed, simultaneous recording of these two audio signals begins. When the playback key 46 is pressed, simultaneous playback begins.

By using a remote controller 80 having this type of construction together with a conventional audio, conference or other type of cassette tape player 10, and a cassette tape containing blank sections to allow repetition for language study or other applications, the sounds from both the cassette tape player 10 and microphone 62 are recorded in the IC memory 22. Then, without the need for tape rewinding and other complex operations, the sounds from the cassette tape playback and microphone can be repeatedly heard as many times as necessary and compared. As a result, an audio or conference type cassette tape player or other device can be utilized with the remote controller to produce a recording and replay system, which effectively functions as a tool for applications such as language study.

The above described embodiments are not meant to limit the present invention. Numerous variations are possible within the scope of the present invention. For instance, the foregoing descriptions referred to using a conventional cassette tape player 10 as an audio playback device. However, other devices having at least a function for playing back sound from a recorded medium, for example, a CD player, minidisk player or DAT (digital analog tape) player, can also be used in the present invention.

The above descriptions also referred to examples wherein the control signal output for remotely controlling the cassette tape player 10 was controlled only by the playback operation key 40 arid stop key 42. However, a stop control signal for stopping the cassette tape player can also be automatically produced from the remote control section 28a during playback of the sound stored in the IC memory 22. In this case, key operation is further simplified during audio playback from the IC memory 22 since the cassette tape player 10 playback operation can be stopped without pressing the stop key 42.

Furthermore, although the above descriptions mentioned a plurality of operation keys, each having a single function, means such as rotary or multistep switches can optionally be used to incorporate a plurality of functions into a single key.

The invention may be embodied in other specific forms without departing from the spirit or essential characteristics thereof. The preferred embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed is:

1. A remote controller for connecting to and controlling an audio playback device which produces a playback audio signal from audio data stored in a recording medium, the remote controller comprising:

operating means for producing recording and playback commands which correspond to respective operations directing recording and playback;

memory means for storing an audio signal;

recording means for writing the audio signal into the memory means in response to the recording command; and playback means for producing a playback output from the audio signal stored in the memory means in response to the playback command.

2. The remote controller according to claim 1, further comprising:

switching means for selecting between the audio signal output of the playback means and the audio signal output from the audio playback device.

3. The remote controller according to claim 1, further comprising:

a microphone for supplying an external sound input;

recording means for writing the audio signal input supplied from the microphone into the memory means in response to the recording command; and playback means for playing back the external sound supplied to the microphone in response to the playback command.

4. The remote controller according to claim 2, further comprising:

a microphone for supplying an external sound input;

recording means for writing the audio signal input supplied from the microphone into the memory means in response to the recording command; and playback means for playing back the external sound supplied to the microphone in response to the playback command.

5. The remote controller according to claim 3, further comprising:

mixing means for mixing the audio signal from the microphone and the audio signal output from the audio playback device;

recording means for writing the audio signal output from the mixing means into the memory means in response to the recording command; and playback means for playing back the mixed audio signal in response to the playback command.

6. The remote controller according to claim 4, further comprising:

mixing means for mixing the audio signal from the microphone and the audio signal output from the audio playback device;

recording means for writing the audio signal output from the mixing means into the memory means in response to the recording command; and playback means for playing back the mixed audio signal in response to the playback command.

7. The remote controller according to claim 4, wherein the recording means further comprises:

analog to digital converter means for converting the audio signal output from the audio playback device into a digital signal; and recording control means for controlling writing the digital signal from the analog to digital converter means into the memory means.

8. The remote controller according to claim 6, wherein the recording means further comprises:

analog to digital converter means for converting the audio signal output from the audio playback device into a digital signal; and recording control means for controlling writing the digital signal from the analog to digital converter means into the memory means.

9. The remote controller according to claim 7, wherein the playback means further comprises:

playback control means for performing readout of the digital signal stored in the memory means in response to the playback command; and digital to analog converter means for converting the digital signal readout from the memory means into an analog audio signal.

10. The remote controller according to claim 8, wherein the playback means further comprises:

playback control means for performing readout of the digital signal stored in the memory means in response to the playback command; and digital to analog converter means for converting the digital signal readout from the memory means into an analog audio signal.

11. The remote controller according to claim 9, further comprising:

remote control means for sending a playback operation control signal and a stop control signal to the audio playback device in response to playback operation and stop commands of the remote controller; and operating means of the remote controller for producing the remote control playback operation and stop command outputs.

12. The remote controller according to claim 10, further comprising:

remote control means for sending a playback operation control signal and a stop control signal to the audio playback device in response to playback operation and stop commands of the remote controller; and operating means of the remote controller for producing the remote control playback operation and stop command outputs.

13. The remote controller according to claim 11, wherein the operating means outputs the recording command during the remote control playback operation command output.

14. The remote controller according to claim 12, wherein the operating means outputs the recording command during the remote control playback operation command output.

15. The remote controller according to claim 14, further comprising:

audio output means for converting the audio signal output from the switching means into an audio output.

16. The remote controller according to claim 15, wherein the audio output means comprises an earphone.

17. The remote controller according to claim 2, wherein playback operation of the audio playback device is controlled to stop during the playback command output from the operating means.

18. The remote controller according to claim 14, wherein the remote control means outputs a remote control stop control signal during the playback command output from the operating means.

19. A remote controller for connecting to and controlling an audio playback device which produces a playback audio signal from audio data stored in a recording medium, the remote controller comprising:

a microphone for supplying an external sound input to the remote controller;

operating means for producing recording and playback commands which correspond to respective operations directing recording and playback;

memory means for storing an audio signal;

recording means for writing the sound input from the microphone, in the form of an audio signal input, into the memory means in response to the recording command; and playback means for producing a playback output from the audio signal stored in the memory means in response to the playback command;

the sound supplied to the microphone capable of being recorded and played back while listening to the playback output from the playback means.

* * * * *